United States Patent [19]
Williams et al.

[11] 3,919,951
[45] Nov. 18, 1975

[54] METHOD FOR SUBSOIL APPLICATION

[75] Inventors: Donald E. Williams; Forrest F. Robertson, both of Garden City, Kans.

[73] Assignee: Acra-Plant, Inc., Newton, Kans.

[22] Filed: Feb. 3, 1975

[21] Appl. No.: 546,812

Related U.S. Application Data

[63] Continuation of Ser. No. 395,587, Sept. 10, 1973, abandoned.

[52] U.S. Cl. .................................................. 111/7
[51] Int. Cl.². ........................................ A01C 23/02
[58] Field of Search ................................ 111/7, 6, 1

[56] References Cited
UNITED STATES PATENTS

| | | | |
|---|---|---|---|
| 2,598,121 | 5/1952 | Hannibal | 111/7 |
| 2,619,054 | 11/1952 | Bell | 111/7 |
| 2,768,591 | 10/1956 | James | 111/7 |
| 2,842,077 | 7/1958 | Morrison | 111/7 |
| 2,876,719 | 3/1959 | Holle | 111/7 |
| 3,259,087 | 7/1966 | Horton | 111/7 |

*Primary Examiner*—Stephen C. Pellegrino
*Attorney, Agent, or Firm*—Schmidt, Johnson, Hovey & Williams

[57] ABSTRACT

A knife for applying substances such as fertilizer in solid, liquid or gaseous form cuts a slice in the subsoil with its leading, rearwardly inclined cutting edge and simultaneously firms up and maintains the lower portions of the sides of the slice in readiness for receiving the substance in a pocket formed by a recess at the lowermost rear of the knife in conjunction with the firmed up portions. The slice taken by the slender knife is of such narrowness and the movement of the knife through the subsoil is of such a streamlined nature that the cohesive integrity and inherent resiliency of the subsoil is not destroyed, promoting self-closure of the slice behind the knife, thus greatly reducing the escape of the substance where it is a gas. A forwardly tapering wedge having downwardly converging faces on the bottom of the knife leads rearwardly from a lowermost, forwardly projecting, sharp point to prepare the lower portions of the slice sides in the proper manner, and laterally projecting, forwardly converging wings overlying the recess of the knife behind the wedge help seal the pocket to trap the substance when it is a gas, such wings also serving to return and press subsoil into the slice after the deposit of the substance.

4 Claims, 9 Drawing Figures

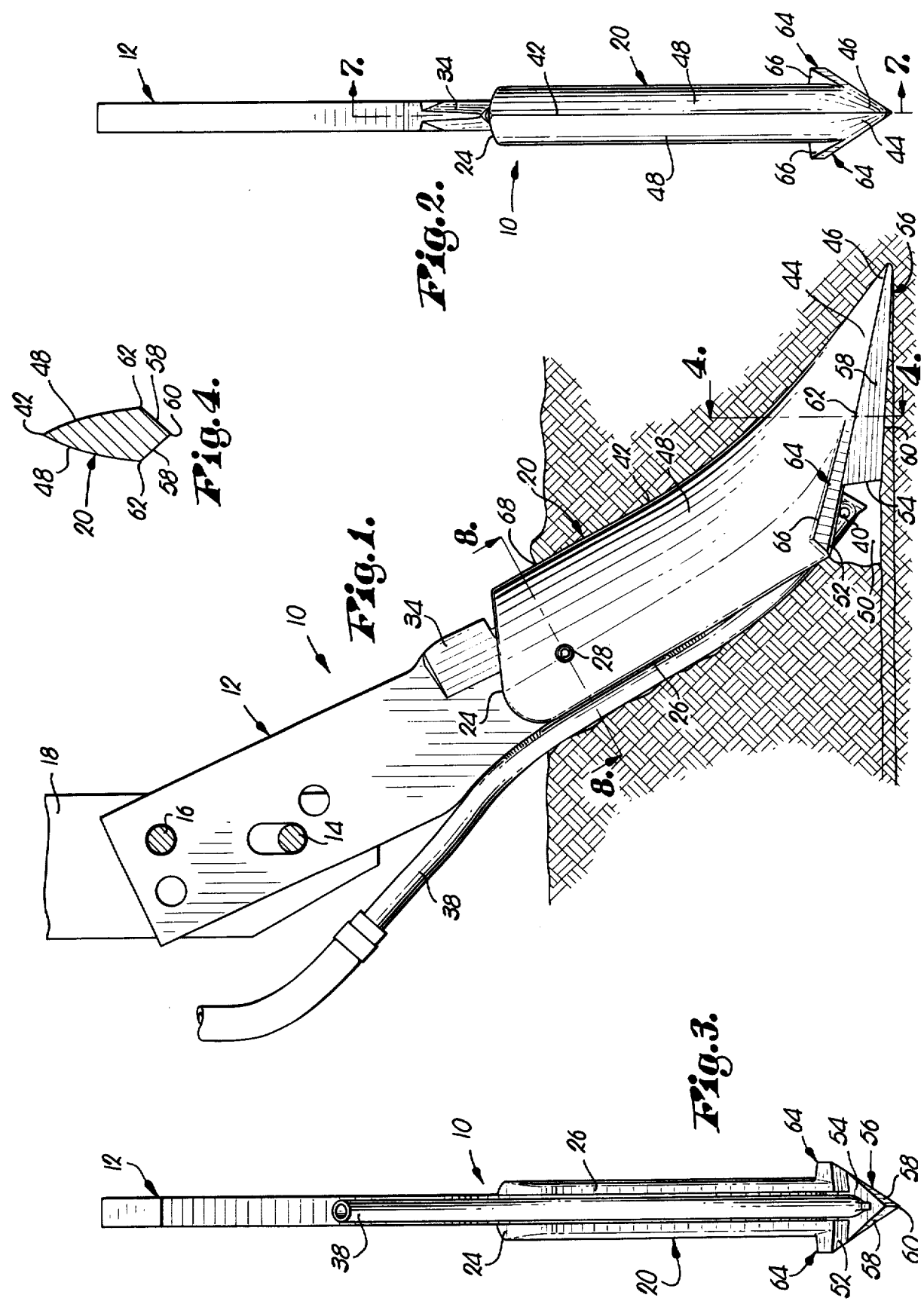

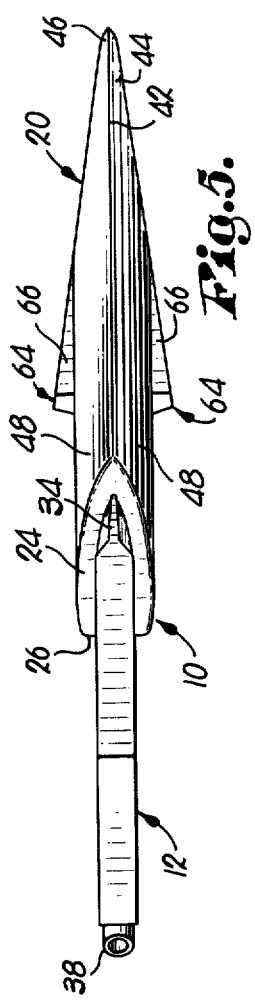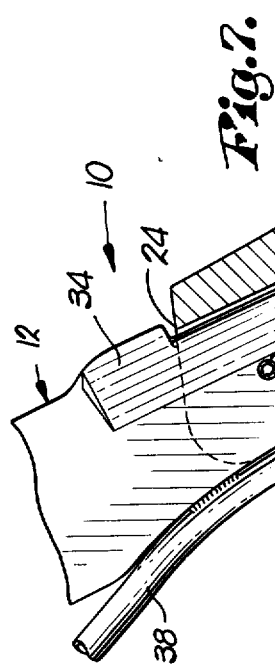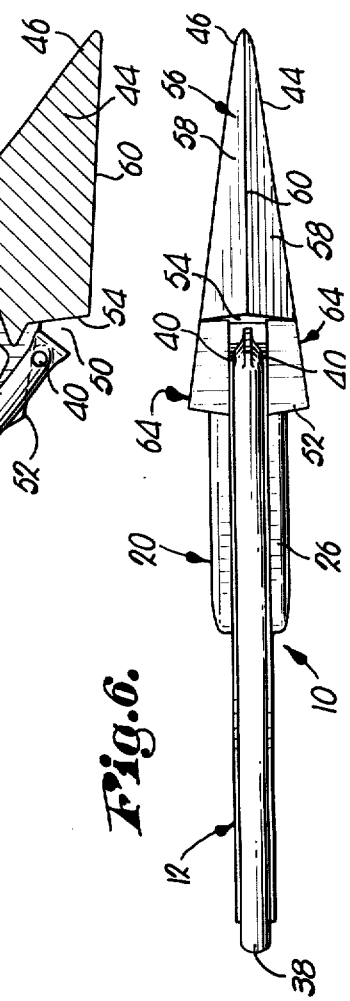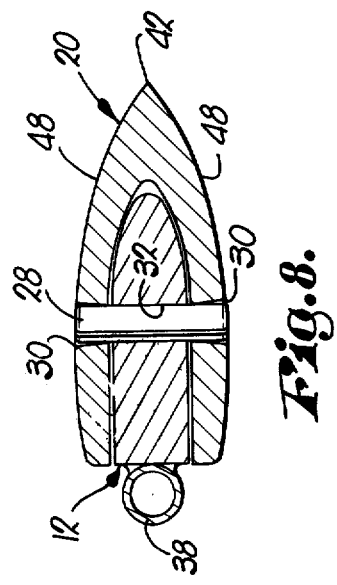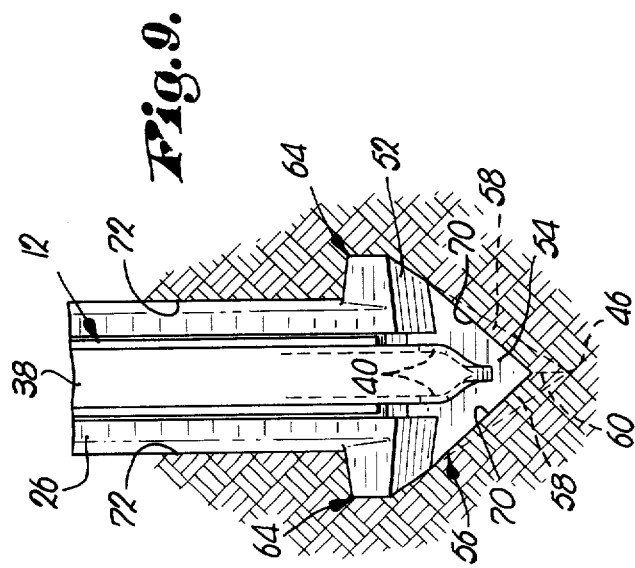

METHOD FOR SUBSOIL APPLICATION

This is a continuation of application Ser. No. 395,587 filed on Sept. 10, 1973, now abandoned.

This invention relates to the application of substances such as fertilizers, herbicides, fungicides and the like to the subsoil beneath the surface of the ground in order to serve the ultimate goal of producing high crop yields of superior quality. This invention has particular utility in the application of anhydrous ammonia fertilizer to the subsoil and, accordingly, in order to make the concepts of the present invention most clear, the description which follows primarily refers to ammonia gas as the substance involved; however, it is to be understood that such is done for purposes of illustration only and that the principles of the present invention are not limited to a specific substance, be it gas, liquid or solid.

While the use of anhydrous ammonia as a fertilizer to provide the necessary nitrogen content to the soil has steadily grown in popularity in fairly recent years, the technology required to properly handle this substance and to apply it to the soil in the most efficient manner possible has lagged seriously behind. In many instances, because of the crudeness of the tools being used to apply the ammonia, it was not uncommon to observe heavy streams or vapor trails of the ammonia gas issuing from the soil behind the advancing applicator implement. Obviously, such a situation resulted in extremely high degrees of wastage of the substance, as well as rendering the actual increased benefit to the soil by such loose practices somewhat questionable.

Typical applicators included blunt-nosed tools that bulldozed their way through the subsoil, tearing and shoving it apart to produce a yawning trough full of loose clods and other particulate matter for receiving the ammonia gas. The large open expanse of the troughs thus produced and their loose, cloddy natures could not help but allow the immediate escape to the atmosphere of the gas issuing from the applicator, even though such issuance was effected at a point substantially near the bottom of the trough. The gas issued under substantial pressure and at its point of issuance sought the path of least resistance, which was up through the open expanse of the trough and through the many escape passages formed between the clods and loose particles of material within the trough. Instead of being projected into the subsoil to enrich the same as intended, a substantial portion of the gas merely escaped rapidly behind the applicator into the atmosphere where it was only partially ineffectual in enriching the soil.

Thus, the developers of previous applicators and methods associated therewith failed to recognize that the subsoil at the point of application of the gas must be prepared in such a careful, highly controlled manner as to make it most receptive to the gas being introduced thereto. Further, they failed to realize that control over the issuing gas can best be effected at the precise point of issuance rather than at some remote, trailing point on the surface of the ground such as through a trailing tool to re-cover the trench. Moreover, they failed to appreciate that the soil itself, through its inherent resiliency and cohesiveness can be of significant help in trapping and retaining the issuing gas if the soil is not substantially displaced and the formation of clods is minimized.

Accordingly, one important object of the present invention is to provide an applicator and method for introducing substances to the subsoil which take full advantage of the inherent, helpful characteristics of the soil without destroying the same and which are in accordance with the concept that the soil must be prepared and controlled at the precise point of application in such a manner that it is the most receptive to such application if the best results are to be achieved.

Pursuant to the foregoing, another important aspect of this invention is to provide slicing of the subsoil by a slender knife having a lowermost, sharp point and a special wedge along its bottom leading rearwardly from the point that serves to firm up and maintain the lower portions of the sides of the slice free of loose, cloddy materials for the reception of the substance into the area being vacated by the wedge.

An additional important object of this invention is to provide an applicator knife that passes through the subsoil in such a streamlined fashion and with a slice of such narrowness that the slice is virtually self-closing.

A further important object of the instant invention is the provision of an applicator knife as aforesaid having a special recess behind the slice-maintaining wedge thereof that cooperates with the firmed portions of the slice and the returning soil therebehind to form a receiving pocket for the substance being introduced to the subsoil.

Another important object of this invention is the provision of laterally extending wings on the opposite sides of the knife that overlie the recess of the latter to effectively seal the pocket and thus minimize upward escape of the substance where the latter is in a gaseous state.

Yet another important object of the present invention is to provide for return of displaced soil by the wings of the knife and gentle downward pressing of such returned soil immediately after the deposit of the substance into the pocket.

Other important objects of this invention include presenting the knife in the form of a detachable shoe that can be quickly and easily slipped onto or off of a mounting shank therefor to facilitate maintenance and repair; decreasing the likelihood of soil freezing to the exterior of the knife as a result of the extremely cold temperature at which ammonia gas issues, such decreased freezing being made possible by an insulating air space between the knife and the mounting shank therefof; lowering the power required to advance the knife through the subsoil in order to provide increased operating efficiency; obtaining excellent application with high efficiency at increased operating speeds; and decreasing the tendency for roots and other trash to collect on the knife by configuring the latter in such a manner as to make it self-cleaning and self-sharpening.

In the drawings:

FIG. 1 is a side elevational view of the applicator knife of the present invention during advancement through the subsoil;

FIG. 2 is a front elevational view thereof;

FIG. 3 is a rear elevational view thereof;

FIG. 4 is a vertical cross-sectional view of the knife in its operating orientation of FIG. 1 taken along line 4—4 of FIG. 1;

FIG. 5 is a top plan view of the knife detached from the mounting piece of the implement;

FIG. 6 is a bottom plan view of the knife;

FIG. 7 is a side elevational view of the knife illustrating the detachable shoe thereof in cross section;

FIG. 8 is an enlarged cross-sectional view of the knife taken along line 8—8 of FIG. 1; and FIG. 9 is an enlarged, fragmentary, rear elevational view of the knife as it moves through the subsoil.

The knife 10 includes an elongated shank 12 that may be attached at its upper end by bolts 14 and 16 to a downwardly depending bracket piece 18 of an applicator implement, and a subsoil slicing body 20 in the nature of a shoe that slips onto the lower end of shank 12. The shoe 20 has an internal cavity 22 and is open along its top end 24 and its trailing edge 26 for receiving the shank 12 within cavity 22. An expansion pin 28 (shown best in FIG. 8) is forced through a pair of aligned openings 30 in shoe 20 and a bore 32 in shank 12 to removably hold shoe 20 attached to shank 12, and an abutment 34 on shank 12 above upper end 24 of shoe 20 precludes any swinging of the latter in one direction about pin 28 while the lower tip 36 of shank 12 precludes swinging of shoe 20 in the opposite direction. An elongated tube 38 is welded to the back of shank 12 extending downwardly from a source of supply of the substance such as ammonia gas to be applied, terminating at its lowermost end slightly beyond shank 12 with a pair of lateral discharge outlets 40.

The shoe 20 is very streamlined in configuration, having an essentially "bullet" shaped cross-sectional configuration as illustrated in FIG. 8. The shoe 20 is elongated with its longitudinal axis extending generally upwardly but inclined rearwardly to an extent when in use, there being a leading, longitudinally extending and longitudinally concave slicing edge 42 extending from upper end 24 to lower end 44 and terminating in a sharp point 46. A pair of transversely convex, opposed sides 48 extend rearwardly from leading edge 42 to trailing edge 26 so that shoe 20 progressively increases in width as leading edge 42 is departed and trailing edge 26 is approached, at least to the point determined by aligned openings 30. The trailing edge 26 is substantially wider than tube 38 so that the latter is well within the outer limits of trailing edge 26 to reduce abrasion on tube 38 during advancement of the knife 10 through a subsoil.

The bottom end 44 of shoe 20 is stepped, having a recess 50 defined by a downwardly facing, flat surface 52 extending forwardly from a trailing edge 26 and an upright, rearwardly facing shoulder 54 at the rearmost end of a wedge 56 leading forwardly from shoulder 54 to point 46. The discharge outlets 40 of tube 38 are disposed within the recess 50 a short distance below surface 52 and behind shoulder 54 in order to discharge the substance directly into recess 50 during operation.

The wedge 56 is cross-sectionally triangular having a pair of opposed faces 58 that converge transversely toward point 46 and converge downwardly to terminate in a common, longitudinal, lowermost edge 60 that is normally generally horizontal and extends from point 46 rearwardly to shoulder 54. As may be noted best from FIG. 4, the sides 48 of shoe 20 are bowed outwardly in the area along the cross-sectional line 4—4, terminating at their upper extent in cutting edge 42 and at their lower extent in abrupt changes of direction in the form of the faces 58 of wedge 56. A line of juncture 62 is thus presented between each side 48 and its corresponding face 58, such juncture line 62 extending rearwardly from point 46 and being inclined with respect to the common lowermost edge 60 as the trailing edge 26 is approached.

A pair of elongated wings 64 extend laterally outwardly from opposite sides 48 generally between the shoulder 54 and trailing edge 26. Wings 64 progressively increase in width as trailing edge 26 is approached, and their lower extent defines the surface 52 overlying recess 50. The junction lines 62 lie in the same, inclined plane as the surface 52 so that the bottom end 44 of shoe 20 is rendered very streamlined, and also contributing to this fact are the upper flats 66 of wings 64 which slope downwardly from a point adjacent trailing edge 26 to merge with sides 48 adjacent junction line 62.

In use, the knife 10 is oriented as shown in FIG. 1 with the longitudinal axis of shoe 20 inclined slightly rearwardly from vertical. Thus, the slicing edge 42 is similarly rearwardly inclined or sloped, but preferably such rearward inclination is an amount which will leave the wedge 56 at its shoulder 54 slightly elevated with respect to point 46. In this orientation, the shoe 20 is inserted into the subsoil to the approximate depth shown so that the top of the slice along the surface of the ground at point 68 slightly trails the majority of the recess 50, such a relationship being especially important where the substance being applied is ammonia gas as distinguished from a purely liquid or solid, particulate material.

As the knife 10 advances, the slicing edge 42 neatly divides the subsoil so that the remaining area of the shoe 20 can pass therethrough with a minimum of drag. As the slice is produced at point 46, the wedge 56 immediately engages the lowermost portions of the sides of the slice and, with faces 58, progressively applies a firming and smoothing action to such portions to eliminate the existence of loose, cloddy material and to assure that a V-shaped configuration is imparted to the lowermost slice portions as illustrated in FIG. 9. For purposes of identity, such portions are denoted by the numeral 70. That area of the slice above portions 70 will have substantially vertical sides as denoted by the numerals 72 in FIG. 9.

Because of the smoothing, firming, and maintaining action rendered by wedge 56, a very well defined pocket is formed by the recess 50 amd portions 70 so that substances discharging through outlets 40 are trapped within the pocket in contact with the portions 70. In the case of ammonia gas, this is extremely important inasmuch as the gas is normally discharged under considerable pressure and will seek the path of least resistence when released from tube 38. If the gas is trapped within the pocket, having no place to go but into the portions 70, then the extent of escape will be quite minimal and the efficiency of the applicating process greatly increased.

The wings 64 overlying recess 50 are quite helpful in maintaining the gas in its proper position immediately upon discharge thereof because the wings 64 serve to seal the upper extremity of the pocket formed by recess 50 and the proximal areas of the subsoil. Actually, because the wings 64 project laterally outwardly beyond the wedge 56 at its widest point (shoulder 54), the wings 64 produce their own lateral grooves in the subsoil outwardly beyond the sides 72 of the slice to make it virtually impossible for the gas to escape upwardly even after penetrating the portions 70 for a short distance.

Moreover, the lateral channeling by wings 64 into the subsoil above portions 70 causes soil to be returned behind the recess 50 and gently pressed downwardly to cover the void left by the vacating wedge 56. Thus, the gas issuing from outlets 40 is even further trapped within the pocket because the area immediately behind the same is closed off, precluding any escape in that direction. Thus, at precisely the critical point, that at which the gas is being applied to the soil, very extensive control is imparted thereto in order to force the gas to behave in the desired manner instead of as it so pleases. Rather than simply discharging the gas with the hope that it will probably do the job for which it is intended, positive steps are taken to assure not only that the area within which the gas is to be received is most receptive therefor, but also that immediately upon its introduction to such area, the gas is exposed to positive controls to manipulate it in the desired fashion to obtain the desired results.

It will be recognized that as the shoe 20 is advanced through the subsoil and the slice is neatly produced by the leading edge 42, the sides 72 of the slice are disturbed as little as possible and are gently separated or divided instead of being brutally bulldozed out of the way. Thus, the sides 72 retain their inherent resiliency and cohesiveness to spring back toward one another after shoe 20 passes in order to effectively close the slice. While such action also occurs at the very bottom of the slice in the area of portions 70, the action of the wedge 56 against such portions 70 tends to prolong their separation, and thus, while portions 70 do in fact selfclose to a large extent, the presence of the wings 64 augments such closing action to assure that the area is totally and completely sealed behind the departing shoe 20.

The V-shaped configuration imparted to the slice at portions 70 thereof by wedge 56 is important inasmuch as it places portions 70 closer to outlets 40 than would be the case if the configuration were generally rectangular having vertical side stretches and a flat lower margin. Thus, as shown best in FIG. 9, gas issuing from the outlets 40 is immediately exposed to portions 70 and is projected thereinto for absorption by the soil.

As earlier mentioned, where gas is being applied, it is beneficial, although not mandatory, to run the knife 10 with the point 68 at the top of the slice of the surface of the ground trailing the major portion of recess 50. This is done so that in the highly unlikely event that any gas should escape around wings 64, the escaping gas would not have any directly vertical escape route to the atmosphere. Instead, it would be forced to flow rearwardly and upwardly in order to reach the surface of the ground, and such additional resistance would tend to deter the escape at all. Where liquid and particulate solids are applied, such relationship is not especially significant.

Also worthly of re-emphasis at this point is the extremely valuable role played by the wedge 56 with its sloping faces 58 in preparation of the slice for the reception of the substance. Without wedge 56, it would be necessary to rely upon the cutting edge 42 and proximal areas of sides 48 to properly prepare the slice. But such regions are considerably forwardly of and upwardly from the precise point of discharge of the substance, thus increasing the chances of the slice re-closing prior to the introduction of the substance, and also increasing the likelihood of crumbling to occur. By virtue of the elongated nature of the faces 58 and their strategic location directly and immediately ahead of the discharge outlets 40, the slice cannot re-close before the substance is applied, and sufficient smoothing, firming and maintaining actions are imparted against the slice to rid the same of loose particles or cloddy material. Therefore, in the case of a gaseous substance no air escape passages to the atmosphere are presented, because no clods or other loose materials remain to form such passages, and virtually all of the gas is directed into the portions 70.

Also noteworthy is the clearly apparent fact that substantially less power will be required to advance the knife 10 through the subsoil than has heretofore been the case with typical blunt-nosed, bulldozer-like applicator tools. This makes the applicating job much less arduous than has heretofore been true and, moreover, the configuration and orientation of shoe 20 is such as to pull itself downwardly into the subsoil during advancement so that substantially reduced downward pressure must be applied.

The detachable nature of shoe 20 from shank 12 is significant first because it affords a greatly simplified and convenient arrangement for replacing worn out or broken shoes 20. To this end, it is only necessary to force the pin 28 out of shoe 20 and shank 12, whereupon shoe 20 will simply slip off. It is then but necessary to place a new shoe on shank 12 and reinsert a pin 28, whereupon the knife 10 is again ready for operation. This requires but a few minutes down time and thus not only saves valuable working daylight hours but also encourages the replacement of broken or damaged shoes 20 when such is necessary. Thus, the application process can be carried out in the proper manner at all times with well performing, non-damaged or worn shoes 20.

Moreover, the essentially jacketing relationship of shoe 20 with shank 12 means that an insulating air space is formed between the two parts which reduces the tendency for shoe 20 to become so cold that the soil will freeze thereto during operation. Such an undesirable occurence would result in increasing the width of the shoe 20 as soil built up thereupon, thus diminishing its streamlined nature and enlarging the slice beyond that necessary and desirable.

The significantly improved durability of shoe 20 when compared to prior devices is also of importance because such reduces the frequency with which worn shoes must be replaced and contributes to proper dirt stream flow as shoe 20 moves through the subsoil. It has been found that the concavity of knife edge 42 is important in this respect because such concavity prolongs the length of time that edge 42 remains sharp, and in fact, helps make edge 42 virtually self-sharpening. Moreover, the concavity helps produce dirt stream flow of such a nature that the slice is re-covered sooner and with larger amounts than would otherwise be the case, hence further reducing the tendency for gas to escape from behind the advancing shoe 20. Further, the essentially diamond-shape cross-sectional configuration imparted to shoe 20 at the point defined by line 4—4 in FIG. 1 and as illustrated in FIG. 4 is beneficial in that the points of frictional engagement with the subsoil are spread out more and are greater in number than would be the case were a blunt-nosed, three surfaced tool used. Hence, overall wear is reduced because the total soil friction is spread over a greater surface area.

Having thus described the invention, what is claimed as new and desired to be secured by Letters Patent is:

1. The method of introducing a substance into the soil while advancing in a predetermined direction comprising the steps of:

penetrating the soil down to a preselected level;

making a continuous line cut in the soil along the forwardmost extent of penetration extending upwardly without interruption from said preselected level to the upper surface of the soil;

progressively parting the soil immediately behind the line cut until a slice of predetermined transverse dimensions is produced, said progressive parting of the soil taking place at a uniform rate of transverse growth along the full length of the line cut until said predetermined transverse dimensions are reached;

forming a small, transversely V-shaped bottom in the slice immediately behind the line cut at said preselected level;

progressively enlarging said bottom both transversely and upwardly at a uniform rate of growth while retaining the bottom transversely V-shaped;

firming up the downwardly converging sides of the bottom simultaneously with said forming and enlarging of the bottom;

discontinuing said enlarging and firming up of the bottom at a point spaced rearwardly from said line cut;

producing a closed top pocket in said bottom between its firmed up sides;

discharging a substance into said pocket and transversely against the firmed up sides immediately behind the point of discontinuance of enlarging and firming up the bottom; and filling said pocket with soil and allowing the slice to close immediately following discharge of the substance into the pocket.

2. The method as claimed in claim 1, wherein said line cut is made in an upwardly and rearwardly inclined attitude.

3. The method as claimed in claim 2, wherein the line cut is made downwardly and rearwardly concave from the surface of the soil to said preselected level.

4. The method as claimed in claim 1, wherein said penetrating of the soil includes piercing the same at the lowermost extent of the line cut.

* * * * *